(12) United States Patent
Clevorn

(10) Patent No.: US 8,989,784 B2
(45) Date of Patent: Mar. 24, 2015

(54) RADIO COMMUNICATION DEVICES AND METHODS FOR CONTROLLING A RADIO COMMUNICATION DEVICE

(71) Applicant: Intel Mobile Communications GmbH, Neubiberg (DE)

(72) Inventor: Thorsten Clevorn, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/688,317

(22) Filed: Nov. 29, 2012

(65) Prior Publication Data

US 2014/0148150 A1 May 29, 2014

(51) Int. Cl.
*H04W 68/00* (2009.01)
(52) U.S. Cl.
CPC .................... *H04W 68/005* (2013.01)
USPC .................. 455/458; 455/500; 455/501
(58) Field of Classification Search
None
See application file for complete search history.

(56) References Cited

U.S. PATENT DOCUMENTS

| | | | |
|---|---|---|---|
| 5,396,645 A * | 3/1995 | Huff | 455/441 |
| 6,522,642 B1 * | 2/2003 | Scott | 370/342 |
| 2003/0108135 A1 * | 6/2003 | Frigon | 375/354 |
| 2007/0098122 A1 * | 5/2007 | Tseng et al. | 375/347 |
| 2007/0254679 A1 * | 11/2007 | Montojo et al. | 455/458 |
| 2008/0227456 A1 * | 9/2008 | Huang et al. | 455/436 |
| 2009/0228756 A1 * | 9/2009 | Cookman et al. | 714/752 |
| 2009/0257487 A1 * | 10/2009 | Wang et al. | 375/240.02 |
| 2013/0322399 A1 * | 12/2013 | Ma et al. | 370/331 |
| 2013/0343494 A1 * | 12/2013 | Bolinth et al. | 375/341 |

* cited by examiner

*Primary Examiner* — Magdi Elhag

(57) ABSTRACT

A radio communication device may include: a receiver configured to receive a first signal in a first shared radio communication channel of a first cell and configured to receive a second signal in a second shared radio communication channel of a second cell, wherein the first signal includes an information and the second signal includes the same information; and a determination circuit configured to determine the information based on the received first signal and the received second signal.

23 Claims, 4 Drawing Sheets

RADIO COMMUNICATION DEVICES AND METHODS FOR CONTROLLING A RADIO COMMUNICATION DEVICE

TECHNICAL FIELD

Aspects of this disclosure relate generally to radio communication devices and methods for controlling a radio communication device.

BACKGROUND

For a mobile device such as a radio communication device, power consumption may be a key parameter. When there is no active dedicated connection (e.g. a voice call) the mobile device may try to save power by switching off e.g. the modem or RF (radio frequency). But the mobile device may still desire to wake up from time to time to listen to certain information, e.g. if it is paged. These wake-up times should be as rare and short as possible to avoid too high power consumption. But on the contrary, a sufficient reception performance must be achieved to successfully receive e.g. the pagings.

SUMMARY

A radio communication device may include: a receiver configured to receive a first signal in a first shared radio communication channel of a first cell and configured to receive a second signal in a second shared radio communication channel of a second cell, wherein the first signal includes an information and the second signal includes the same information; and a determination circuit configured to determine the information based on the received first signal and the received second signal.

A method for controlling a radio communication device may include: receiving a first signal in a first shared radio communication channel of a first cell and receiving a second signal in a second shared radio communication channel of a second cell, wherein the first signal includes an information and the second signal includes the same information; and determining the information based on the received first signal and the received second signal.

A radio communication device may include: a determination circuit configured to determine an information based a first signal received in a first shared radio communication channel of a first cell and a second signal received in a second shared radio communication channel of a second cell, wherein the first signal includes the information and the second signal includes the same information.

A method for controlling a radio communication device may include: determining an information based a first signal received in a first shared radio communication channel of a first cell and a second signal received in a second shared radio communication channel of a second cell, wherein the first signal includes the information and the second signal includes the same information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

Figure 1:
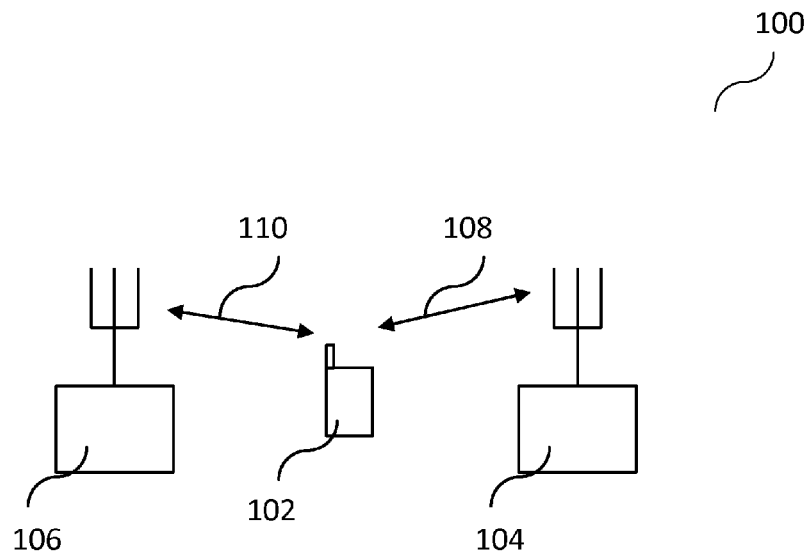
FIG. 1 shows a mobile radio communication system.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

As used herein, a base station (which may also be referred to as a radio base station) may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a mobile radio communication system 100. A radio communication device 102 may receive a signal from a first base station 104, for example wirelessly like indicated by arrow 108. The radio communication device 102 may further receive a signal from a second base station 106, for example wirelessly like indicated by arrow 110. The radio communication device 102 may perform measurements, for example of the first radio base station 104 and of the second radio base station 106, and may store information about the measurements or about the measured radio base stations.

Devices and methods may be provided for dynamic combining of common channel data to improve reception performance.

For a mobile device like a radio communication device, power consumption may be a key parameter. When there is no active dedicated connection (e.g. a voice call) the mobile device may try to save power by switching off for example the modem or the RF (radio frequency), for example the RF circuits. But it may still desire to wake up from time to time to listen to certain information, e.g. if it is paged. These wake-up times may be desired to be as rare and short as possible to avoid too high power consumption. But on the contrary, a sufficient reception performance may be desired to be achieved to successfully receive e.g. the pagings.

In the following, UMTS (Universal Mobile Telecommunications System) standard may be described as example, but the devices and methods described may also be applied to other standards, for example LTE (Long Term Evolution).

Figure 2:
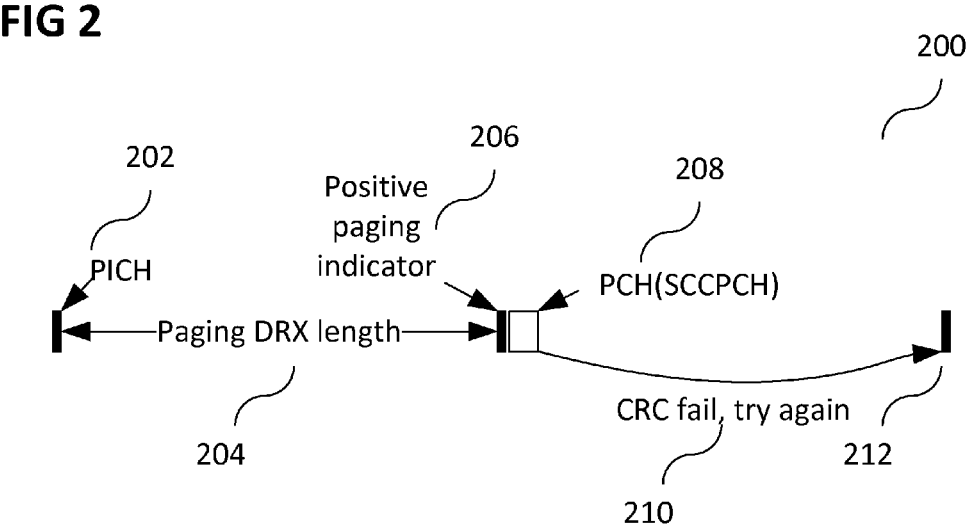
FIG. 2 shows an example for paging.

FIG. 2 shows an example for paging in UMTS. It is to be noted that time is assumed to progress from left to right. In the "idle mode", the UE may listen only to one NodeB, i.e. it may be "camped on a cell". It is to be noted that by "idle mode", it may be referred in general to the 3GPP (Third Generation Partnership Project) states where there is no active data connection, i.e. "Idle", "CELL_PCH", "URA_PCH". Depending on the concrete field of application, only some of the 3GPP states may be relevant for the devices and methods provided. In a commonly applied solution, the UE may wake up in certain intervals and may listen to the camped cell. The UE may know the wake-up time and distance from reading some common channel, e.g. the broadcast channel (BCH). For example the UE may wake up to listen for the paging indicator (PI) on the paging indicator channel (PICH) 202. In case of a negative PI, the UE may go to sleep again for the paging interval and may wake up again at the next PI 206, for example after a paging DRX (discontinuous reception) length 204. In case of a positive PI 206, the UE may try to receive the following paging channel (PCH) 208, which may be sent on the secondary common control physical channel (SCCPCH). If a PCH with a good CRC (cyclic redundancy check) was received, the paging may be successful and the UE may start establishing the call. If not (for example if a PCH with a false CRC was received), this may either be due to bad reception quality for the PCH/SCCPCH or a false alarm by the PI/PICH. In both cases, the UE may desire to wait the complete paging interval 210 to try again, and may receive another PI 212 after the complete paging interval 210.

Various devices and methods may be provided, and they will be explained herein based on the paging detection in UMTS, but they may also be applicable to other channels in UMTS, e.g. CMAS (commercial mobile alert system), and other standards, e.g. LTE.

Figure 3:
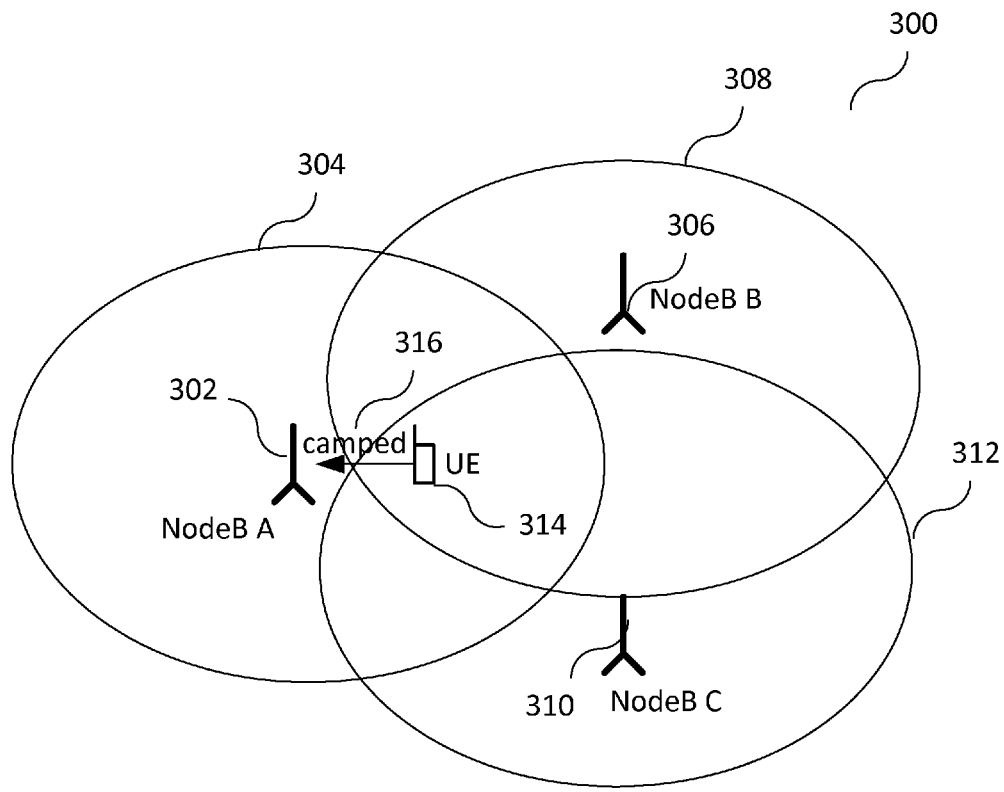
FIG. 3 shows an example network with three base stations.

FIG. 3 shows a network 300 with various base stations (for example with three NodeBs). In the mobile network 300, a UE 314 may not only see one NodeB, but it may receive signals from several NodeBs. It may select the NodeB with the strongest signal as the NodeB it listens to. For example, a first NodeB 302 (NodeB A) may be the strongest one with a first coverage area 304. The UE 314 may camp on NodeB A 302, like indicated by arrow 316, but the UE 314 may also in a coverage area 308 of a second NodeB 306 (NodeB B) and in a coverage area 312 of a third NodeB 310 (NodeB C).

If the UE 316 is in the URA_PCH state, which may typically be the case in idle mode, the network may not know the location of the UE 316 at cell/NodeB level, but only at URA (UTRAN registration area) level. This may reduce cell update messages between the network (NW) and the UE 314, if the UE 314 moves through the NW. However, this may imply also that the NW must broadcast the paging messages in the complete URA, while the UE 314 according to commonly used methods and devices may listen only to one.

The different NodeBs may not time be aligned, in other words, they may broadcast their information at different timings and also the paging information for the UE may be transmitted at different timings.

Figure 4:
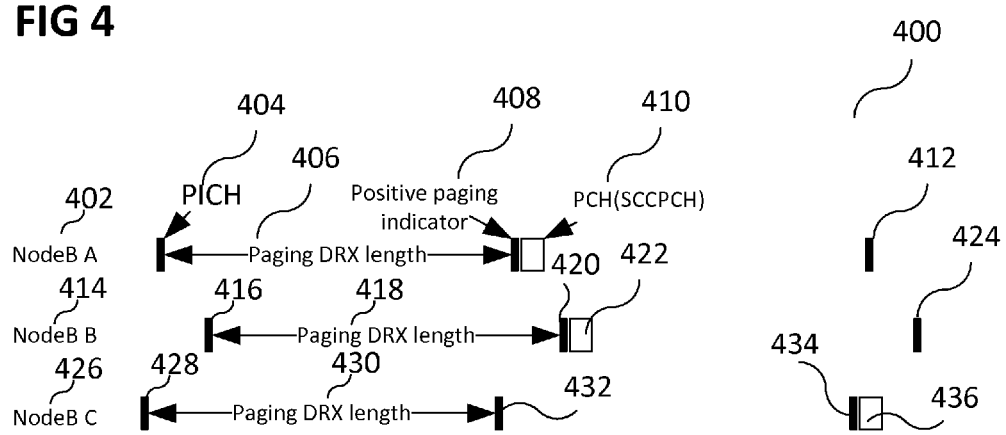
FIG. 4 shows a diagram of different timings of exemplary base stations.

FIG. 4 shows a flow diagram 400 illustrating different timings of exemplary NodeBs. It is to be noted that time is assumed to progress from left to right. It may be assumed that presently no information for the radio communication device is present, so that the PI on the PICH may be negative, and that the radio communication device, upon reception of the PICH may go to sleep again. For example a first NodeB 402 (NodeB A) may transmit the PICH in 404. For example a second NodeB 414 (NodeB B) may transmit the PICH in 416. For example a third NodeB 426 (NodeB B) may transmit the PICH in 428, and after a paging DRX length 430 may again transmit the PICH in 432. For example after the third NodeB 426 has transmitted the PICH in 432, information for the radio communication device may arrive in the network. Thus, from now, the NodeBs may transmit a positive PI on the PICH, and furthermore may transmit PCH for the radio communication device. For example, the first NodeB 402 may, a paging DRX length 406 after the negative PI on the PICH 404, transmit a positive paging indicator 408, and furthermore may transmit PCH 410 on the SCCPCH. For example, the second NodeB 414 may, a paging DRX length 418 after the negative PI on the PICH 416, transmit a positive paging indicator 420, and furthermore may transmit PCH 422 on the SCCPCH. For example, the third NodeB 426 may, a paging DRX length after the negative PI on the PICH 432, transmit a positive paging indicator 434, and furthermore may transmit PCH 436 on the SCCPCH. After each NodeB once sent out a positive paging indicator (PI), the NodeBs may continue with negative PIs, for example the first NodeB 402 in 412, and the second NodeB 414 in 424.

Because the length of the PI and PCH may be very short compared to the paging interval, the UE may listen to all NodeBs, as long as their channels do not overlap. The UE may then combine the information received from all NodeBs in a certain combining interval, e.g. from one PI from the main camped cell to the next PI from this cell, to improve its reception performance. This combining may be performed according to various different methods. For example, a "hard" combining may be performed, wherein signals from each NodeB may be decoded separately and may be checked for a good CRC (cyclic redundancy check). For example, a "soft" combining may be performed, wherein all NodeBs may transmit the same information as the NW does not know where the UE is. Thus, the soft bits before the (channel) decoder may be combined (i.e. added) and the (channel) decoder may run on the combined information. This diversity combining may results in a significantly improved performance. Various devices and methods may be provided for combining as described above.

When the UE wakes up for every NodeB it receives, the power consumption may be increased. In the example described above, the power consumption may be increased by a factor of 3, i.e. the stand-by time may be reduced by a factor of 3.

If the paging instances of the different NodeBs overlap, not all NodeBs may be read. In the example described above, the PI may be read from all NodeBs, but the PCH of NodeB C may overlap with the PI from NodeB A. Thus, a priority decision may be provided, for example for the main camped cell A, in case of a resource conflict in the UE. Since PI and PCH may be on different physical channels, this may be reasonable.

To receive the signals from the different NodeBs, the UE may desire to know the timing of the NodeBs. Reading the timing may desire some resources and may consume power. But as the UE is moving through the NW, the other NodeBs may be previous camped cells, so their timing may be known form the past. Furthermore, acquiring the timing may be a onetime process, thus it may not give a continuous long term penalty in power consumption and may be acceptable.

Various devices and methods may be provided which not always read other NodeBs (and consume power), but do that only when necessary. Thus, a smart dynamic algorithm may be provided, which may adapt to the current scenario and may balance performance with power consumption.

Examples for when it may be beneficial to wake up to receive a signal from another NodeB will be described in the following.

For example, if a radio communication devices gets a negative or positive PI on the main NodeB, but this information is unreliable (for example a low correlation of the signal is determined), the radio communication device may confirm the information on one or more other NodeB(s).

For example, if a radio communication device gets a (reliable) positive PI on the main NodeB, but a CRC error occurs on the PCH, the radio communication device may read the PCH on one or more other NodeB(s).

Various devices and methods may be provided which may adapt to the general quality of the cells (for example RSSI (received signal strength indication), RSCP (Received signal code power), Edo (ratio of the received energy per chip to the total received power spectral density at the UE antenna connector)).

If the main NodeB is good, no other NodeB may be demodulated.

Only other NodeBs above a certain quality threshold may be evaluated.

Various devices and methods may consider the different timings of the NodeBs, e.g. if the information in another NodeB is shortly after the main NodeB (example NodeB A->NodeB B in FIG. 4 above), it may be read; if there is a large distance (NodeB C in FIG. 4), it may not be read.

Various devices and methods may be provided which may perform combining only when necessary like described above.

Various devices and methods may be applicable e.g. to the CMAS (commercial mobile alert system) data in UMTS, which may be broadcasted on the SCCPCH like the PCH or the paging procedure in LTE.

The additional received signals may be seen as a diversity receive path, with independent fading, noise, and signal strength. Thus, results for various devices and methods may be extrapolated from receive diversity results. Assuming exemplary one other cell with the same noise and signal strength as the main camped cell, a demodulation performance gain of 3 dB may be gained in static conditions and more than 3 dB (up to 7 dB or more) in fading conditions.

Devices and methods may be provided for combing the received signals from several NodeBs, which may be broadcasted messages and according to commonly used devices and methods are read only from one NodeB. Devices and methods may do this combining and the reading of additional NodeBs only when necessary (e.g. bad conditions or unreliable results) to reduce the addition power consumption.

Furthermore, the demodulation performance of the main camped cell may be improved e.g. by receive diversity or interference cancellation.

Devices and methods may be provided which always combine information from various base stations, like described above.

Figure 5:
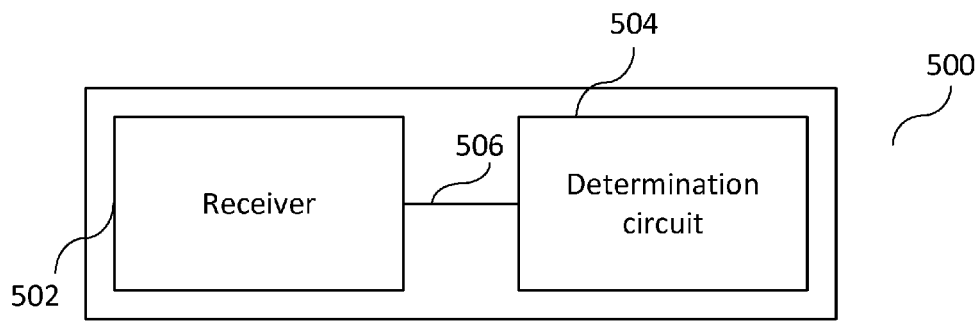
FIG. 5 shows a radio communication device.

FIG. 5 shows a radio communication device 500. The radio communication device 500 may include a receiver 502 configured to receive a first signal in a first shared radio communication channel of a first cell and configured to receive a second signal in a second shared radio communication channel of a second cell. The first signal may include or may be an information and the second signal may include or may be the same information. The radio communication device 500 may further include a determination circuit 504 configured to determine the information based on the received first signal and the received second signal (in other words: may perform combining of the first signal and the second signal to determine the information). The receiver 502 and the determiner 504 may be coupled with each other, for example via a connection 506, for example an optical connection or an electrical connection, such as for example a cable or a computer bus or via any other suitable electrical connection to exchange electrical signals.

The information may include or may be paging information.

The information may include or may be a paging indicator channel (PICH) and/or a paging channel (PCH).

The first shared radio communication channel and the second shared radio communication channel may include or may be a control channel.

The first shared radio communication channel and the second shared radio communication channel may include or may be a paging indicator channel and/or a paging channel.

The determination circuit 504 may further evaluate the information from the first radio communication channel and may evaluate the information from the second radio communication channel. The determination circuit 504 may further determine as the information the evaluated information from the first radio communication channel, if the evaluated information from the first radio communication channel and the evaluated information from the second radio communication channel match. The determination circuit 504 may determine as the information an error signal, if the evaluated information from the first radio communication channel and the evaluated information from the second radio communication channel do not match.

The determination circuit 504 may further combine soft bits of the first shared radio communication channel and soft bits of the second shared radio communication channel, and may determine the information based on the combination.

Figure 6:
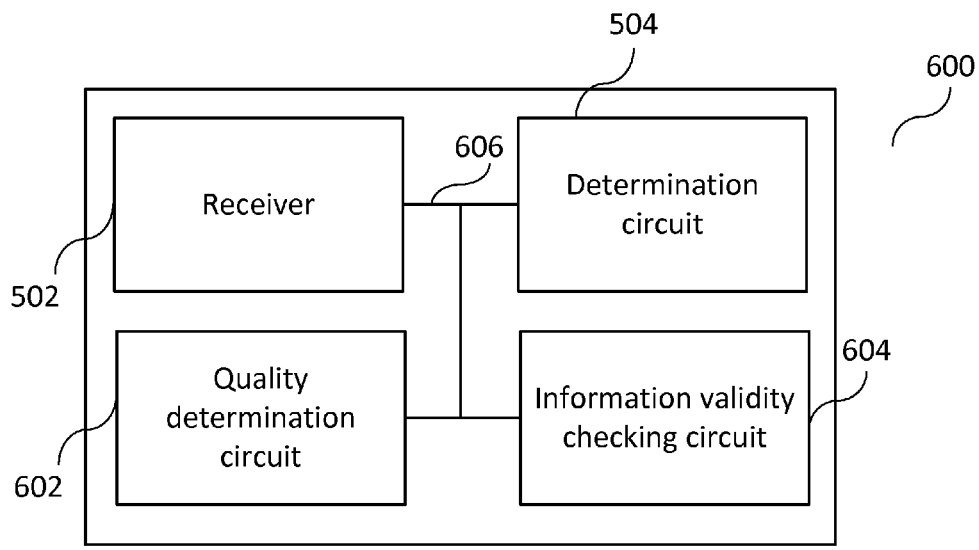
FIG. 6 shows a radio communication device with a quality determination circuit and an information validity circuit.

FIG. 6 shows a radio communication device 600. The radio communication device 600 may, similar to the radio communication device 500 of FIG. 5, include a receiver 502. The radio communication device 600 may, similar to the radio communication device 500 of FIG. 5, include a determination circuit 504. The radio communication device 600 may further include a quality determination circuit 602, like will be described below. The radio communication device 600 may further include an information validity checking circuit 604, like will be described below. The receiver 502, the determiner 504, the quality determination circuit 602, and the information validity checking circuit 604 may be coupled with each other, for example via a connection 606, for example an optical connection or an electrical connection, such as for example a cable or a computer bus or via any other suitable electrical connection to exchange electrical signals.

The quality determination circuit 602 may determine a quality of reception in the first shared radio communication channel.

The determination circuit 504 may further evaluate information from the second radio communication channel if (for example if and only if in other words: iff) the determined quality of reception in the first shared radio communication channel is below a pre-determined threshold.

The information may include or may be a paging indication. The receiver 502 may further receive further paging information if the paging indication includes or represents or is a positive paging indication. The information validity checking circuit 604 may check validity of the received further paging information. The determination circuit 504 may further evaluate information from the second radio communication channel if (for example if and only if in other words: iff) the received further paging information is not valid.

The information validity checking circuit 604 may check validity of the received further paging information based on a cyclic redundancy check.

Figure 7:
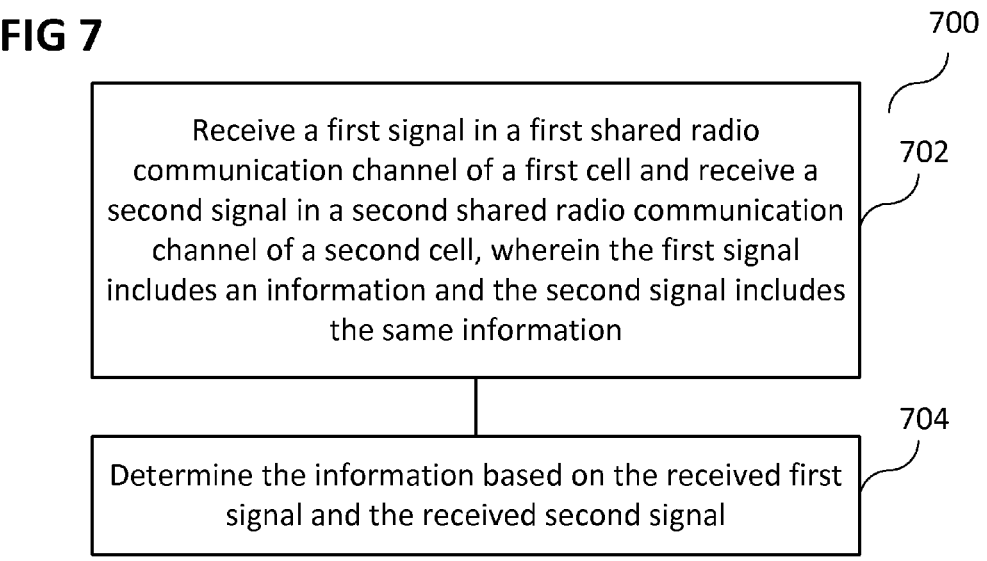
FIG. 7 shows a flow diagram illustrating a method for controlling a radio communication device (for example a radio communication device of FIG. 5 or of FIG. 6)

FIG. 7 shows a flow diagram 700 illustrating a method for controlling a radio communication device. In 702, a receiver of the radio communication device may receive a first signal in a first shared radio communication channel of a first cell and may receive a second signal in a second shared radio communication channel of a second cell. The first signal may include or may be an information. The second signal may include or may be the same information. In 704, a determination circuit of the radio communication device may determine the information based on the received first signal and the received second signal.

The information may include or may be paging information.

The paging information may include or may be a paging indicator channel and/or a paging channel.

The first shared radio communication channel and the second shared radio communication channel may include or may be a control channel.

The first shared radio communication channel and the second shared radio communication channel may include or may be a paging indicator channel and/or a paging channel.

The determination circuit of the radio communication device may evaluate the information from the first radio communication channel. The determination circuit of the radio communication device may evaluate the information from the second radio communication channel. The determination circuit of the radio communication device may determine as the information the evaluated information from the first radio communication channel, if the evaluated information from the first radio communication channel and the evaluated information from the second radio communication channel match. The determination circuit of the radio communication device may determine as the information an error signal, if the evaluated information from the first radio communication channel and the evaluated information from the second radio communication channel do not match.

The determination circuit of the radio communication device may combine soft bits of the first shared radio communication channel and soft bits of the second shared radio communication channel. The determination circuit of the radio communication device may further determine the information based on the combination.

The determination circuit of the radio communication device may determine a quality of reception in the first shared radio communication channel.

The determination circuit of the radio communication device may evaluate information from the second radio communication channel if (for example if and only if; in other words: iff) the determined quality of reception in the first shared radio communication channel is below a pre-determined threshold.

The information may include or may be a paging indication. The method may further include: receiving further paging information if the paging indication includes (or represents or is) a positive paging indication; checking validity of the received further paging information; and evaluating information from the second radio communication channel if (for example if and only if; in other words: iff) the received further paging information is not valid.

The information validity checking circuit may check the validity of the received further paging information based on a cyclic redundancy check.

Figure 8:
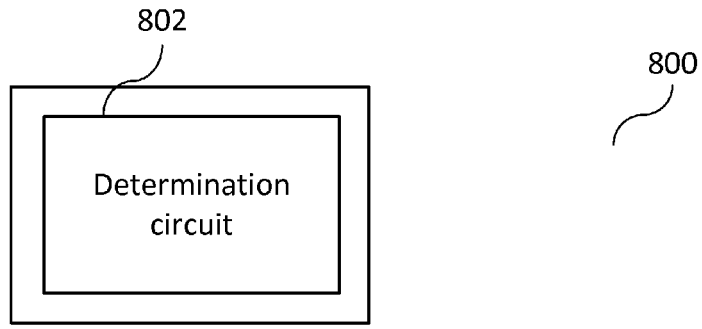
FIG. 8 shows a radio communication device with a determination circuit.

FIG. 8 shows a radio communication device 800. The radio communication device 800 may include a determination circuit 802 configured to determine an information based a first signal received in a first shared radio communication channel of a first cell and a second signal received in a second shared radio communication channel of a second cell. The first signal may include the information. The second signal may include the same information.

The first shared radio communication channel and the second shared radio communication channel may include or may be a control channel.

Figure 9:
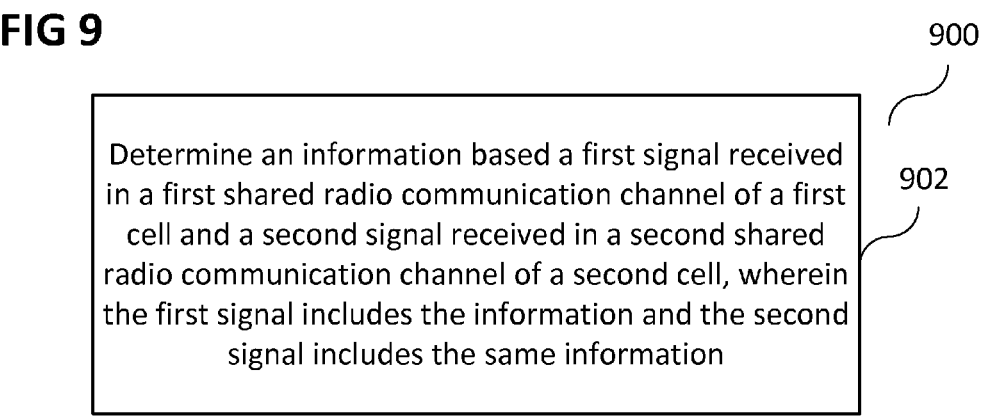
FIG. 9 shows a flow diagram illustrating a method for controlling a radio communication device (for example a radio communication device of FIG. 8).

FIG. 9 shows a flow diagram 900 illustrating a method for controlling a radio communication device. In 902, a determination circuit of the radio communication device may determine an information based a first signal received in a first shared radio communication channel of a first cell and a second signal received in a second shared radio communication channel of a second cell. The first signal may include or may be the information. The second signal may include or may be the same information.

The first shared radio communication channel and the second shared radio communication channel may include or may be a control channel.

Any one of the radio communication devices described above may be a radio communication device configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System–Time-Division Duplex), TD-CDMA (Time Division–Code Division Multiple Access), TD-CDMA (Time Division–Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
a receiver configured to receive a first signal in a first shared radio communication channel of a first cell and configured to receive a second signal in a second shared radio communication channel of a second cell, wherein the first signal comprises an information and the second signal comprises the same information; and
a determination circuit configured to determine the information based on the received first signal and the received second signal;
the determination circuit further configured to evaluate the information from the first shared radio communication channel and configured to evaluate the information from the second shared radio communication channel; and
the determination circuit further configured to determine as the information the evaluated information from the first shared radio communication channel, if the evaluated information from the first shared radio communication channel and the evaluated information from the second shared radio communication channel match, and to determine as the information an error signal, if the evaluated information from the first shared radio communication channel and the evaluated information from the second shared radio communication channel do not match.

2. The radio communication device of claim 1, wherein the information comprises paging information.

3. The radio communication device of claim 2, wherein the paging information comprises at least one of a paging indicator channel or a paging channel.

4. The radio communication device of claim 1, wherein the first shared radio communication channel and the second shared radio communication channel comprise a control channel.

5. The radio communication device of claim 1, wherein the first shared radio communication channel and the second shared radio communication channel comprise at least one of a paging indicator channel or a paging channel.

6. The radio communication device of claim 1, the determination circuit further configured to combine soft bits of the first shared radio communication channel and soft bits of the second shared radio communication channel, and further configured to determine the information based on the combination.

7. The radio communication device of claim 1, further comprising:
a quality determination circuit configured to determine a quality of reception in the first shared radio communication channel.

8. The radio communication device of claim 7, the determination circuit further configured to evaluate information from the second radio communication channel if the determined quality of reception in the first shared radio communication channel is below a pre-determined threshold.

9. The radio communication device of claim 1, wherein the information comprises a paging indication;
the receiver further configured to receive further paging information if the paging indication comprises a positive paging indication;
the radio communication device further comprising:
an information validity checking circuit configured to check validity of the received further paging information;
the determination circuit further configured to evaluate information from the second radio communication channel if the received further paging information is not valid.

10. The radio communication device of claim 9, the information validity checking circuit configured to check validity of the received further paging information based on a cyclic redundancy check.

11. A method for controlling a radio communication device, the method comprising:
receiving a first signal in a first shared radio communication channel of a first cell and receiving a second signal in a second shared radio communication channel of a second cell, wherein the first signal comprises an information and the second signal comprises the same information;
determining the information based on the received first signal and the received second signal;
evaluating the information from the first shared radio communication channel;
evaluating the information from the second shared radio communication channel;
determining as the information the evaluated information from the first shared radio communication channel, if the evaluated information from the first shared radio communication channel and the evaluated information from the second shared radio communication channel match; and
determining as the information an error signal, if the evaluated information from the first shared radio communication channel and the evaluated information from the second shared radio communication channel do not match.

12. The method of claim 11, wherein the information comprises paging information.

13. The method of claim 12, wherein the paging information comprises at least one of a paging indicator channel or a paging channel.

14. The method of claim 11, wherein the first shared radio communication channel and the second shared radio communication channel comprise a control channel.

15. The method of claim 11, wherein the first shared radio communication channel and the second shared radio communication channel comprise at least one of a paging indicator channel or a paging channel.

16. The method of claim 11, further comprising:
combining soft bits of the first shared radio communication channel and soft bits of the second shared radio communication channel; and
determining the information based on the combination.

17. The method of claim 11, further comprising:
determining a quality of reception in the first shared radio communication channel.

18. The method of claim 17, further comprising:
evaluating information from the second radio communication channel if the determined quality of reception in the first shared radio communication channel is below a pre-determined threshold.

19. The method of claim 11, wherein the information comprises a paging indication;
the method further comprising:
receiving further paging information if the paging indication comprises a positive paging indication;
checking validity of the received further paging information; and
evaluating information from the second radio communication channel if the received further paging information is not valid.

20. A radio communication device comprising:
a determination circuit configured to determine an information based on a first signal received in a first shared radio communication channel of a first cell and a second signal received in a second shared radio communication channel of a second cell, wherein the first signal comprises the information and the second signal comprises the same information;
the determination circuit further configured to evaluate the information from the first shared radio communication channel and configured to evaluate the information from the second shared radio communication channel; and
the determination circuit further configured to determine as the information the evaluated information from the first shared radio communication channel, if the evaluated information from the first shared radio communication channel and the evaluated information from the second shared radio communication channel match, and to determine as the information an error signal, if the evaluated information from the first shared radio communication channel and the evaluated information from the second shared radio communication channel do not match.

21. The radio communication device of claim 20, wherein the first shared radio communication channel and the second shared radio communication channel comprise a control channel.

22. A method for controlling a radio communication device, the method comprising:
determining an information based on a first signal received in a first shared radio communication channel of a first cell and a second signal received in a second shared radio communication channel of a second cell, wherein the first signal comprises the information and the second signal comprises the same information;
evaluating the information from the first shared radio communication channel;
evaluating the information from the second shared radio communication channel; and
determining as the information the evaluated information from the first shared radio communication channel, if the evaluated information from the first shared radio communication channel and the evaluated information from the second shared radio communication channel match;

determining as the information an error signal, if the evaluated information from the first shared radio communication channel and the evaluated information from the second shared radio communication channel do not match.

23. The method of claim 22, wherein the first shared radio communication channel and the second shared radio communication channel comprise a control channel.

\* \* \* \* \*